3,574,144
CERAMIC COMPONENT FOR MAGNETOHYDRODYNAMIC GENERATOR ELECTRODE

David Yerouchalmi, Le Mesnil-St.-Denis, France, assignor to Commissariat a l'Energie Atomique, Paris, France
No Drawing. Filed Jan. 24, 1969, Ser. No. 793,907
Claims priority, application France, Jan. 24, 1968, 137,311
Int. Cl. H01b 1/06; G21d 7/02
U.S. Cl. 252—521      2 Claims

ABSTRACT OF THE DISCLOSURE

A ceramic component which is intended for use in the fabrication of MHD generator electrodes and has high-temperature strength as well as high resistance to the corrosive action of the seed in the feed gas. The component mainly contains at least one of the magnesium spinels $MgO$—$Cr_2O_3$ and $MgO$—$Al_2O_3$ to which is added an alkaline-earth oxide CaO, BaO or SrO in a proportion within the range of 1 to 10 mole percent.

---

This invention is directed to a ceramic component which is intended to be employed in the fabrication of electrodes for magnetohydrodynamic (MHD) generators.

During operation, the electrodes of the type at present employed in MHD generators have a hot frontal face which is in contact with the hot ionized gases as said gases flow through the generator duct whereas said electrodes are cooled by means of a cooling agent which is circulated in the vicinity of the opposite face. A single electrode is often made up of a number of ceramic components separated by plates formed of heat-resistant metals which facilitate heat transfer processes between the hot face and the cooled face.

The use of a number of different refractory ceramic materials has already been proposed for the fabrication of electrodes of the type referred-to. Such ceramic materials are intended to withstand high operating temperatures and must be capable of affording resistance to electrolytic and electrochemical phenomena which are caused by the flow of current. Accordingly, these materials must have high electron conductivity at operating temperatures in order to prevent polarization of electrodes in an MHD generator which generates direct current.

It has been found that, when employing electrodes made of conventional ceramic materials, the frontal face of the material which is in contact with the hot gases supplied to the MHD generator undergoes a process of degradation. The corrosion phenomena which are observed appear to be essentially due to the alkali metal seeding material which is added in these gases to cause ionization. In fact, the degree of damage caused is particularly marked at the level at which, as a result of cooling of the electrodes, the temperature of the ceramic component is such as to cause liquefaction of the alkali metal used for seeding the hot gases.

The object of the present invention is to provide a ceramic component which meets the different requirements set forth hereinabove more effectively than the ceramic materials employed up to the present time and which makes it possible in particular to avoid the process of degradation of electrodes by the alkali metal used to "seed" the gases which are supplied to an MHD generator.

The invention proposes a ceramic component for an MHD generator electrode which essentially consists of at least one of the magnesium spinels $MgO$—$Al_2O_3$ and $MgO$—$Cr_2O_3$ and which is present in a proportion of at least 90 mole percent.

The ceramic component in accordance with the invention is usually prepared by sintering at high temperature or by fusion.

The spinels employed are refractory and highly resistant to corrosion, even in the presence of liquid alkali metals, and also permit the fabrication of sintered components which have high mechanical strength. These spinels are endowed naturally with electrical conductivity.

However, in accordance with a secondary property of the invention, the spinel contains an alkaline-earth oxide CaO, BaO or SrO, the molar proportion of which is advantageously comprised between 1 and 10% and preferably of the order of 1 to 5%. The presence of this additive assists thermo-ionic emission and thus enhances the conductivity of the ceramic component.

By way of example, a magnesium spinel $MgO$—$Al_2O_3$ or $MgO$—$Cr_2O_3$ is fused at a temperature of the order of 2000° C. and an additive such as BaO, CaO or SrO which assists thermionic emission is incorporated therewith. The aggregate is formed and sintered at a temperature of the order of 1700° C. The ceramic components obtained possess high electron conductivity at the high temperatures at which the electrodes of MHD generators operate. Said components afford resistance to the corrosive action of alkali metals especially in liquid form as well as to electrochemical action which results from the passage of a direct current.

What I claim is:

1. A ceramic component for an MHD generator electrode consisting essentially of at least one of the magnesium spinels $MgO$—$Cr_2O_3$ and $MgO$—$Al_2O_3$, the proportion of spinel in the ceramic material being at least 90 mole percent, and an additive of an alkaline-earth oxide selected from the group consisting of CaO, BaO and SrO, the proportion of additive in the spinel being from 1 to 10 mole percent.

2. A ceramic component in accordance with claim 1, the proportion of additive in the spinel being from 1 to 5 mole percent.

References Cited
UNITED STATES PATENTS

| | | | |
|---|---|---|---|
| 2,316,229 | 4/1943 | Berlek | 106—59 |
| 3,083,123 | 3/1963 | Navias | 106—62 |
| 3,149,253 | 9/1964 | Luebke | 252—518 |
| 3,155,534 | 11/1964 | Bruch | 106—62 |
| 3,304,153 | 2/1967 | Bakker et al. | 106—62 |
| 3,429,723 | 2/1969 | Maier et al. | 106—59 |

DOUGLAS J. DRUMMOND, Primary Examiner

U.S. Cl. X.R.

106—59, 62; 310—11